United States Patent [19]

Ostertag

[11] Patent Number: 4,840,677
[45] Date of Patent: Jun. 20, 1989

[54] PLATELETLIKE TWO-PHASE PIGMENT

[75] Inventor: Werner Ostertag, Gruenstadt, Fed. Rep. of Germany

[73] Assignee: BASF Aktiengesellschaft, Ludwigshafen, Fed. Rep. of Germany

[21] Appl. No.: 201,207

[22] Filed: Jun. 2, 1988

[30] Foreign Application Priority Data

Jun. 2, 1987 [DE] Fed. Rep. of Germany ....... 3718446
Jun. 13, 1987 [DE] Fed. Rep. of Germany ....... 3719804

[51] Int. Cl.$^4$ .............................................. C09C 1/22
[52] U.S. Cl. ..................................... 106/456; 106/459
[58] Field of Search ....................................... 106/456

[56] References Cited

U.S. PATENT DOCUMENTS

| | | |
|---|---|---|
| 3,926,659 | 12/1975 | Bernhard et al. . |
| 3,946,103 | 3/1976 | Hund ................................... 106/456 |
| 4,053,325 | 10/1977 | Vauderheiden ..................... 106/456 |
| 4,289,746 | 9/1981 | Hayakawa et al. ................. 106/456 |
| 4,373,963 | 2/1983 | Uenishi et al. . |
| 4,404,254 | 9/1983 | Franz et al. . |
| 4,623,396 | 11/1986 | Kimura et al. . |
| 4,676,838 | 6/1987 | Franz et al. . |

FOREIGN PATENT DOCUMENTS

| | | |
|---|---|---|
| 0014382 | 2/1982 | European Pat. Off. . |
| 2313331 | 12/1973 | Fed. Rep. of Germany . |
| 3433657 | 11/1983 | Fed. Rep. of Germany . |
| 3440911 | 6/1986 | Fed. Rep. of Germany . |

Primary Examiner—Paul Lieberman
Assistant Examiner—Willie J. Thompson
Attorney, Agent, or Firm—Keil & Weinkauf

[57] ABSTRACT

A plateletlike two-phase pigment which has a core with a hematite structure of the composition $$Al_xFe_{2-x}O_3$$

where x is from 0.02 to 0.5, and an outer layer with a spinal structure of the composition $$Al_yFe_{3-y}O_{4+z}$$

where y is from 0.03 to 0.75 and z is from 0 to 0.5, can be prepared by a hydrothermal treatment of plateletlike $Al_xFe_{2-x}O_3$ pigments (x from 0.02 to 0.5) in the presence of a reducing agent dissolved in the aqueous phase.

14 Claims, No Drawings

PLATELETLIKE TWO-PHASE PIGMENT

The present invention relates to effect pigments which consist of two structurally different phases and are prepared by reducing hydrothermally synthesized plateletlike $Al_xFe_{2-x}O_3$ pigments as described in EP 68,311.

The optical effect of effect pigments is due to directional reflection at sheetlike, aligned pigment particles having a high refractive index. Oxidic based effect pigments find utility not only in the paints, plastics, printing and ceramics sector but also in the cosmetics sector.

Aside from the demand for light-colored effect pigments there is also a demand for dark effect pigments, ie. effect pigments which show high luster and high absorption. This is true in particular for applications in the automotive sector and in cosmetics, where particularly attractive visual appearances can be produced by crosscoloring relatively highly absorbant effect pigments with colored pigments or further light-colored effect pigments. In this respect, all possible hue variants of relatively highly absorbent effect pigments are of interest, since these make possible ever new characteristic appearances for coatings or cosmetic products.

There has been no shortage of attempts at producing dark-tone or black effect pigments. For instance, DE-C-2,313,331 describes mica flake pigments which have a coat of polycrystalline magnetite and which, depending on the thickness of the coating, have a mouse-gray to black appearance. Owing to the polycrystalline structure of the pigments, in particular of the coating, such effect pigments, however, do not show the luster, the mechanical stability and the surface properties of hydrothermally synthesized platelet-like pigments where smooth crystal surfaces are present on substantially monocrystalline particles.

The same applies to the mica flake pigments described in DE-A-3,433,657, which are coated with a reduced $TiO_2$ layer.

EP-C-14,382 and DE-A-3,440,911 mention products of the structure of magnetite and maghemite which are preparable from hydrothermally synthesized hematite doped with certain elements. However, these products, the color and gloss of which are not described in detail, are usually fragile on complete conversion of the crystal lattice and lack the mechanical stability of the starting pigments.

It is an object of the present invention to convert the light-colored, coppery lustrous aluminum-containing iron-oxide platelets of the $Al_xFe_{2-x}O_3$ type described in EP-C-68,311 and US-C-4,373,963 into a wide range of coloristically darker colors, up to and including black. This conversion is not to affect the mechanical stability of the pigments, so that they do not break on grinding in paints, plastics or other binders or assistants. Nor is their luster to be affected. The colorly variants are to be obtainable in a readily reproducible manner.

I have found that this object is achieved with a plateletlike two-phase pigment based on aluminum-containing iron oxides which has a core with a hematite structure of the composition $Al_xFe_{2-x}O_3$, where x is from 0.02 to 0.5, and an outer layer with a spinel structure of the composition $Al_yFe_{3-y}O_{4+z}$, where y is from 0.03 to 0.75 and z is from 0 to 0.5, preferably from 0.06 to 0.45.

The pigments according to the invention are preparable by subjecting existing $Al_xFe_{2-x}O_3$ pigments to a hydrothermal treatment in the presence of a reducing agent dissolved in the aqueous phase. In this treatment, which preserves the size and shape of the $Al_xFe_{2-x}O_3$ particles used, the surface is reduced while the core is protected by the resulting shell and remains unaffected. This produces a two-phase pigment which has a core of the composition $Al_xFe_{2-x}O_3$ (x=0.02–0.5) with a hematite structure, while the surface of the pigment has a spinel structure and the composition $Al_yFe_{3-y}O_{4+z}$ (z=0–0.5 and y=0.3–0.75).

Depending on the extent of the reduction, the starting pigments can be converted into novel pigments in a large number of colors which range from the lustrous coppery color of the starting pigment to a lustrous black.

The reducing agent can in general be any water-soluble reducing substance. Particularly suitable are inorganic compounds, such as hydrazine and alkali metal dithionites.

The reduction is carried out hydrothermally, ie. in aqueous solution at above 100° C. To obtain rapid conversion, it is advisable to work at from 150° to 350° C. The pH of the solution is advantageously above 9. If an alkaline pH is used, it is advisable to carry out the hydrothermal treatment of the suspension in the presence of alkali metal aluminates, in particular sodium aluminate, dissolved in the aqueous phase, conveniently in those concentrations which were present as excess in the synthesis of the $Al_xFe_{2-x}O_3$ starting material. This is a reliable way of preventing aluminum being dissolved out of the $Al_xFe_{2-x}O_3$ pigment to be treated.

In this nonrigorous reduction, $Al_xFe_{2-x}O_3$ is initially reduced only at the surface, the reduction proceeding until the composition $Al_yFe_{(3-y)}O_{4.06}$ to $Al_yFe_{(3-y)}O_{4.15}$ having a spinel lattice is obtained. As the reduction proceeds, the $Al_xFe_{2-x}O_3$ is reduced at increasing depths, although the reduction is discontinued before all the pigment is reduced thereby leaving intact a core of $Al_xFe_{2-x}O_3$. The reduction is advantageously discontinued once a hematite:spinel weight ratio of from 99.5:0.7 is present in the reduced pigment. The nonrigorous hydrothermal reduction permits fine control of the degree of reduction of the starting pigment via such parameters as temperature, time, nature of reducing agent and suspension pH, and hence specific conversion to the particular hue desired. Depending on the degree of reduction obtained in the hydrothermal reduction, the light-colored starting pigments of coppery appearance are turned into lustrous two-phase pigments whose colors range from light brown to dark brown to black. Following the hydrothermal treatment, the suspension is cooled, and the pigments are filtered off, washed and dried.

In the hydrothermal treatment described the $Al_xFe_{2-x}O_3$ pigment is in general reduced to such an extent as to produce at the surface a composition conforming to $Al_yFe_{3-y}O_{4+z}$ where z is from 0 or 0.06 to 0.15. Compositions where z ranges from 0.15 to 0.5 are only difficult to obtain in this way. Yet compositions having these z values are readily obtainable by reducing the $Al_xFe_{2-x}O_3$ pigments hydrothermally as described to $Al_yFe_{3-y}O_{4+z}$ with z from 0 or 0.06 to 0.15 and oxidizing the two-phase pigment obtained back under nonrigorous conditions. In this way it is possible to obtain z values of from 0.15 to 0.45. This nonrigorous oxidation can be carried out for example at from 150° to 350° with nitrogen-diluted air, for example with an $O_2:N_2$ volume ratio of from 0.01 to 0.1. This nonrigorous reoxidation preserves the spinel structure of the outer pigment shell similarly to the known oxidation of magnetite to maghemite. By this oxidative treatment the color of the partially reduced starting pigments is lightened again and can be shifted, starting for example from black starting pigments, via blackish brown, then brown to yellowish brown.

The two-phase pigments according to the invention are also preparable by hydrothermally treating an aqueous suspension of plateletlike $Al_xFe_{2-x}O_3$ pigments at above 100° C. in the presence of iron(II) compounds, and then filtering, washing and drying.

Unlike in the procedure described above, where the plateletlike $Al_xFe_{2-x}O_3$ pigments are treated in the presence of a reducing agent such as hydrazine or an alkali metal dithionite, here the plateletlike $Al_xFe_{2-x}O_3$ pigments are not stripped of oxygen. On the contrary, $Fe^{2+}$ ions diffuse through the surface of the $Al_xFe_{2-x}O_3$ platelets into the pigment solid and lead in the outer layer to a conversion of the hematite structure to a spinel structure. At the same time there is a material change to $Al_yFe_{3-y}O_{4-z}$.

The thickness of the dark-colored outer layer of the two-phase pigment increases with the concentration of available divalent iron. However, the conversion is only quantitative in the alkaline range. In the acid range, the reaction does not go to completion, ie. the bulk of the available divalent iron remains in solution. It is therefore advisable to carry out the preparation of the two-phase pigment within the alkaline range, preferably at pH 8-13.

In detail, the two-phase pigments according to the invention are prepared by adding one or more dissolved iron(II) compounds, for example iron(II) salts, in particular iron(II) sulfate, with stirring to the $Al_xFe_{2-x}O_3$ pigment suspended in solution, or suspending the plateletlike $Al_xFe_{2-x}O_3$ pigments in the solution of the iron(II) compound, and then, if desired, neutralizing or basifying the suspension with alkali and subsequently subjecting it to a hydrothermal treatment at above 100° C., conveniently at from 150° to 360° C. In a particularly economic process, the aqueous iron(II) solution is pumped directly after the synthesis of the plateletlike $Al_xFe_{2-x}O_3$ starting pigment into the still hot alkaline pigment suspension.

It will be readily understood that in the preparation of the two-phase pigments the particle shape and size depend on the $Al_xFe_{2-x}O_3$ starting pigment. This is also true of the color of the pigment core, which is not least dependent on the Al content of the platelet-like $Al_xFe_{2-x}O_3$ particles. The particular y value of an $Al_yFe_{3-y}O_{4+7}$ spinel phase obtained by reduction from the $Al_xFe_{2-x}O_3$ composition is obtained of necessity and computes to y=0.03-0.75.

The pigments according to the invention are interesting in particular because of their optical properties and can be used for pigmenting paints, coatings, plastics, printing inks, ceramic surfaces, glasses and cosmetic products.

However, the pigments according to the invention are interesting not just because of their optical properties. They also show electrical and magnetic properties which make them attractive for use in other technical fields, such as electromagnetic screening.

The pigments according to the invention can also be coated with highly refractive oxides, such as $TiO_2$ or $Fe_2O_3$, thereby to produce further coloristically interesting effect pigments.

EXAMPLE 1

(A) Preparation of starting material (as per EP 68,311)

A thoroughly stirred aqueous suspension containing 59 g/l of FeOOH (BET surface area 42 m²/g), 42 g/l of NaOH and 32 g/l of $\gamma$-$Al_2O_3$, passing through a tubular reactor at a rate of 42 kg/h, is heated to 303° C. in the course of 30 minutes, is left at that temperature for 10 minutes and then cooled down and filtered, and the filter residue is washed and dried at 110° C.

The product has a brownish red luster and under the scanning electron microscope is seen to comprise plateletlike particles. The average particle size is determined using a Cilas granulometer as 7.9μ. The specific surface area (BET) is 8.3 m²/g. Chemical analysis indicates 4.5% by weight of Al and 62.5% by weight of Fe of oxidation number III. The pigment can accordingly be calculated to have a composition of $Al_{0.26}Fe_{1.74}O_3$.

(B) 10 g of the product prepared in Example 1A are suspended in 140 g of distilled water and admixed with 10 g of hydrazinium hydroxide ($N_2H_4.H_2O$) by stirring. The mixture is heated to 313° C. in a 300 ml stirred autoclave in the course of 60 minutes and then cooled down. The product is filtered off, washed and dried at 110° C.

The product obtained has a deep brown color and is lustrous. Scanning electron micrographs show that the product is uniform and that the hydrothermal treatment with hydrazine has not affected the platelet character or the average particle size. X-ray studies reveal the presence of a spinel structure as well as that of hematite. A calibration curve is used to determine the hematite:spinel weight ratio as 72:28. Chemical analysis indicates Al as 4.6% by weight, $Fe^{2+}$ as 6.5% by weight and $Fe_{total}$ as 63.2% by weight.

EXAMPLES 2 TO 5

The Examples are carried out similarly to Example 1 using varying amounts of hydrazine. In Example 5, the suspension is additionally admixed with NaOH.

| | Starting wt. in g | | | | | Characterization | | |
|---|---|---|---|---|---|---|---|---|
| Ex. | $Al_xFe_{2-x}O_3$ | $H_2O$ | $N_2H_4.H_2O$ | NaOH | pH | Color | $Fe^{2+}$ (% wt.) | Hematite:Spinel weight ratio |
| 2 | 10 | 140 | 2.5 | — | 7 | brownish red | 0.2 | >99 |
| 3 | 10 | 140 | 5.0 | — | 7 | reddish brown | 1.0 | 96:4 (24.0) |
| 4 | 10 | 140 | 7.5 | — | 7 | light brown | 3.5 | 85:15 (5.67) |
| 5 | 10 | 140 | 5.0 | 1 g | | black | 14.5 | 43:57 (0.75) |

EXAMPLE 6

10 g of plateletlike iron oxide (62.5% by weight of Fe, 4.5% by weight of Al→$Al_{0.26}Fe_{1.74}O_3$, BET=8.3 m²/g, average particle size=6.8 μ) are thoroughly mixed with 140 ml of water, 10 g of 50% strength by weight NaOH and 2 g of sodium aluminate (37.3% by weight of Na₂O, 44% by weight of Al₂O₃) and 2.5 g of sodium dithionite.

This suspension is heated in a 300 ml autoclave with stirring to 220° C. in the course of 30 minutes and then to 315° C. in the course of another 30 minutes. The autoclave is then cooled down and emptied. The product is filtered off with suction, washed until neutral and dried at 100° C. in a through circulation cabinet.

The product has a dark violet color and is lustrous. X-rayograms show hematite and magnetite. Scanning electron micrographs reveal that the product is plateletlike.

Chemical analysis indicates the presence of 9.8% by weight of Fe(II) (spinel portion: 39%, hematite portion: 61%).

EXAMPLE 7 (comparison)

Preparation of a completely reduced single-phase pigment 10 g of the product prepared in Example 1A are admixed with 140 g of H₂O, 12 g of 50% strength by weight sodium hydroxide solution (37% by weight of Na₂O, 44% by weight of Al₂O₃) and 109 g of hydrazinium hydrate. The suspension is heated to 310° C. in a stirred autoclave in the course of 60 minutes. It is then cooled down and filtered, and the filter residue is washed and dried under N₂.

The product is black and comprises single-phase crystals having a spinel lattice. Scanning electron micrographs show that the product is no longer plateletlike, having fragmented into numerous particles. Chemical analysis reveals $Fe^{2+}$=20.4% by weight, Al=3.0% by weight and $Fe_{total}$=60.4% by weight. This computes to a composition of $Al_{0.27}Fe_{2.61}O_{3.89}$. X-rayograms reveal that the pigment no longer has a hematite phase.

EXAMPLE 8

The product prepared in Example 5 is treated at 250° C. in a tubular furnace with a gas stream containing 90% by volume of N₂ and 10% by volume of air for 30 minutes and then cooled down under N₂. The color is blackish brown. Analysis shows that the $Fe^{2+}$ content is 11% by weight. X-ray studies indicate a hematite:spinel phase weight ratio as in the starting material, ie. 43:57=0.75.

EXAMPLES 9 AND 10

The Examples are carried out similarly to Example 8, except that the oxidation time is extended.

| Ex. | Oxidation time | $Fe^{2+}$ content (% weight) | Colour | Hematite/Spinel (weight ratio) |
|---|---|---|---|---|
| 11 | 60 min. | 7.5 | brownish yellow | does not change |
| 12 | 90 min. | 4.0 | brown | |

EXAMPLE 13

30 g of the product prepared in Example 1B are added to 103.8 g of aqueous titanyl sulfate solution containing 5.2% by weight of titanium and 49.7% by weight of H₂SO₄. The suspension is admixed at room temperature with a solution, added dropwise, comprising 23.34 g of Na₂CO₃ and 500 ml of H₂O. While stirring, the mixture is heated to the boil and then kept at that level for 2 hours. 500 ml of hot water at 95° C. are then added in the course of 1 hour, and heating at the boil is continued for a further hour. The mixture is then cooled down. The pigment platelets coated with precipitated titanium oxide hydrate are filtered off, washed and dried at 120° C.

The product obtained has a violet color, is lustrous and on analysis shows a titanium content of 11.9% by weight.

EXAMPLE 14

10 g of the plateletlike iron oxide prepared in Example 1A are stirred together with 70 ml of distilled water, a solution of 3.22 g of iron(II) sulfate hydrate (iron content 19.8% by weight) in 70 ml of water and 1.85 g of 50% strength by weight NaOH solution, giving a pH of 11.2, and the mixture is heated in a 300 ml capacity stirred autoclave to 225° C. in the course of 30 minutes and then to 320° C. in the course of another 30 minutes. The mixture is then cooled down and filtered, and the filter residue is washed free of NaOH and dried.

The product is a lustrous brown. Scanning electron micrographs show that it is uniformly plateletlike. Cilas granulometry reveals an average of 7.85μ for the average maximum particle size. X-rayograms show hematite and magnetite lines. Wet chemical analysis gives Fe total as 64.3% and $Fe^{2+}$ as 4.8% by weight.

The hematite:spinel ratio calculated therefrom is shown in Table 1.

EXAMPLE 15

10 g of the plateletlike $A_{0.26}Fe_{1.74}O_3$ pigment prepared in Example 1A are intimately mixed with 140 ml of distilled water in which 6.44 g of $FeSO_4 \cdot nH_2O$ (Fe content 19.8% by weight) have been dissolved and 3.71 g of 50% strength by weight NaOH, giving a pH of 11.5, and the mixture is heated in a 300 ml capacity stirred autoclave to 220° C. in the course of 30 minutes and then to 315° C. in the course of another 30 minutes, and is then cooled down and filtered, and the filter residue is washed with water until alkali-free and dried at 110° C.

The pigment has a blackish brown color and is lustrous. Scanning electron micrographs show that the product is uniformly plateletlike. Cilas granulometry gives an average of 7.9μ for the average maximum particle size. X-rayograms show the lines of hematite and magnetite.

Chemical analysis gives Fe total as 65% by weight and $Fe^{2+}$ as 8.8% by weight. The calculated hematite:spinel ratio is given in Table 1.

EXAMPLE 16

10 g of the plateletlike pigment prepared in Example 1A are stirred together with 140 ml of distilled water, 1.61 g of iron(II) sulphate hydrate (iron content 19.8% by weight) and 0.93 g of 50% strength by weight aqueous NaOH solution (pH of solution 11.2) and the mixture is heated in a 300 ml capacity stirred autoclave to 215° C. in the course of 30 minutes and then to 310° C. in another 30 minutes. This is followed by cooling down, filtering, washing and drying at 110° C.

The pigment is brownish red and lustrous. Scanning electron micrographs show that the product is uniformly plateletlike. It has an average maximum particle size of 7.9μ.

X-rayograms show the lines of hematite and magnetite. Chemical analysis gives Fe total as 63.7% and $Fe^{2+}$ as 2.1%.

The calculated magnetite:spinel ratio is given in Table 1.

EXAMPLE 17

10 g of the plateletlike pigment prepared in Example 1A, 1.07 g of iron(II) sulfate hydrate (Fe content 19.8% by weight), 0.31 g of NaOH and 141 g of $H_2O$ are thoroughly mixed (pH of mixture 11.0) and the mixture is then heated in a 300 ml stirred autoclave to 210° C. in the course of 30 minutes and then to 325° C. in another 30 minutes. This is followed by cooling down, filtration, washing and drying at 110° C.

The product is a lustrous brownish red, somewhat darker than the starting material. Chemical analysis gives Fe total as 63.3% and $Fe^{2+}$ as 1.4%.

TABLE 1

| Example | $FeSO_4 \cdot nH_2O$ Weight* | Color of product | Hematite:Magnetite ration in % by wt. |
| --- | --- | --- | --- |
| 17 | 1.07 | brownish red | 94.5:5.5 |
| 16 | 1.61 | brown red | 91.7:8.3 |
| 14 | 3.22 | brown | 81:19 |
| 15 | 6.44 | blackish brown | 65:35 |

*based on 100 ml of water

I claim:

1. A plateletlike two-phase pigment based on aluminum-containing iron oxides, which has a core with a hematite structure of the composition $$Al_xFe_{2-x}O_3$$

where x is from 0.02 to 0.5, and an outer layer with a spinel structure of the composition $$Al_yFe_{3-y}O_{4+z}$$

where y is from 0.03 to 0.75 and z is from 0 to 0.5.

2. A plateletlike two-phase pigment as claimed in claim 1, wherein z is from 0.06 to 0.45.

3. A plateletlike two-phase pigment as claimed in claim 1, wherein the weight ratio of hematite:spinel is from 99.5 to 0.7.

4. A process for preparing a two-phase pigment based on aluminum-containing iron oxides, which has a core with a hematite structure of the composition $$Al_xFe_{2-x}O_3$$

where x is from 0.02 to 0.5, and an outer layer with a spinel structure of the composition $$Al_yFe_{3-y}O_{4+z},$$

where y is from 0.03 to 0.75 and z is from 0 to 0.5, which comprises subjecting an aqueous suspension of a plateletlike $Al_xFe_{2-x}O_3$ pigment to a hydrothermal treatment at above 100° C. in the presence of a water-soluble reducing agent and then filtering, washing and drying.

5. A process as claimed in claim 4, wherein the hydrothermal treatment is carried out at from 150° to 360° C.

6. A process as claimed in claim 4, wherein the reducing agent is an inorganic compound.

7. A process as claimed in claim 6, wherein the inorganic reducing agent is hydrazine and/or an alkali metal dithionite.

8. A process as claimed in claim 4, wherein the hydrothermal treatment is continued until the outer layer has a composition $Al_yFe_{3-y}O_{4+z}$ with y from 0.03 to 0.75 and z from 0.06 to 0.15 and the pigment thus obtained is then reoxidized to z values up to 0.45.

9. A process as claimed in claim 8, wherein the reoxidation is carried out with nitrogen-diluted air at from 150° to 350° C.

10. A process as claimed in claim 9, wherein the air has an oxygen:nitrogen volume ratio of from 0.01 to 0.1.

11. A process for preparing a two-phase pigment based on aluminum-containing iron oxides, which has a core with a hematite structure of the composition $$Al_xFe_{2-x}O_3$$

where x is from 0.02 to 0.5, and an outer layer with a spinel structure of the composition $$Al_yFe_{3-y}O_{4+z}$$

where y is from 0.03 to 0.75 and z is from 0 to 0.5, which comprises subjecting an aqueous suspension of a plateletlike $Al_xFe_{2-x}O_3$ pigment to a hydrothermal treatment at above 100° C. in the presence of an iron(II) compound and then filtering, washing and drying.

12. A process as claimed in claim 11, wherein the hydrothermal treatment is carried out at from 150° to 360° C.

13. A process as claimed in claim 11, wherein the treatment is carried out at above pH 7.

14. A process as claimed in claim 12, wherein the treatment is carried out at above pH 7.

* * * * *